INVENTORS
JOSEPH H. CYR &
HORACE G. MC CARTY
BY Donald S. Schaper
ATTORNEY

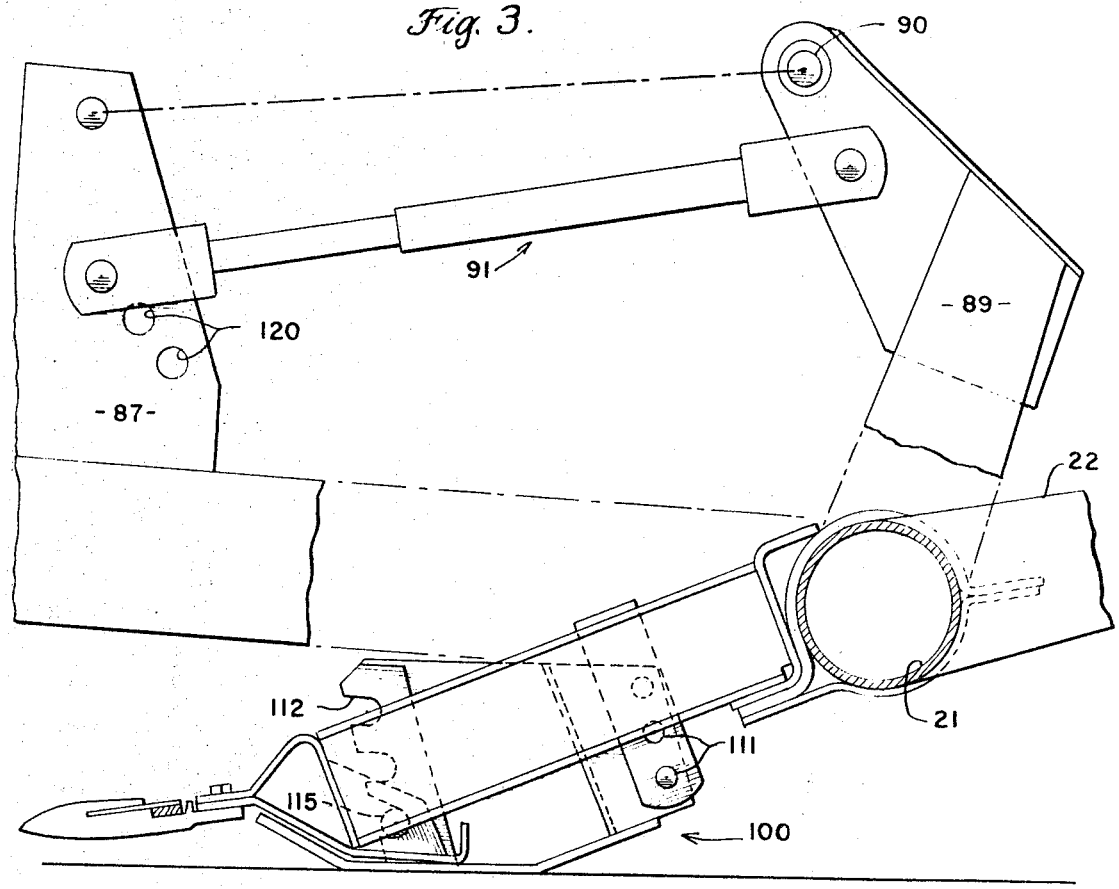
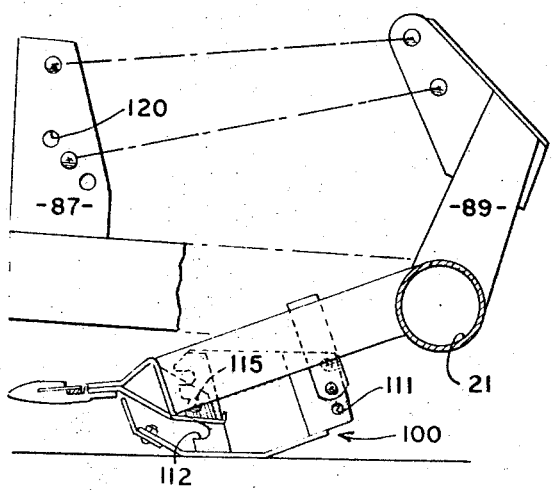
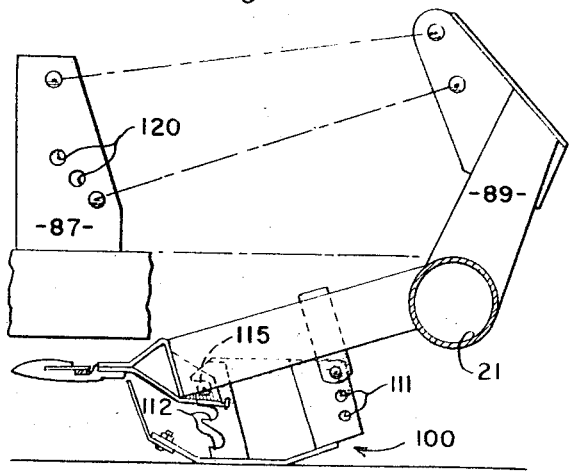
INVENTORS
JOSEPH H. CYR &
HORACE G. MCCARTY

United States Patent Office 3,553,945
Patented Jan. 12, 1971

3,553,945
HEADER CONTROL
Joseph H. Cyr and Horace G. McCarty, New Holland, Pa., assignors to Sperry Rand Corporation, New Holland, Pa., a corporation of Delaware
Continuation of application Ser. No. 612,462, Jan. 30, 1967. This application Aug. 22, 1969, Ser. No. 852,988
Int. Cl. A01d 43/00, 55/02
U.S. Cl. 56—23                                                9 Claims

ABSTRACT OF THE DISCLOSURE

An agriculture machine for mowing, conditioning, and windrowing crop material and having a header pivotally mounted on a vertically adjustable frame. A control system is provided to regulate the operating height of the header and the inclination of the header relative to the ground.

---

This is a continuation of application Ser. No. 612,462, filed Jan. 30, 1967 and now abandoned.

BACKGROUND OF THE INVENTION

The invention relates generally to agricultural machines of the harvester type having adjustable crop gathering headers.

Machines of the above general character comprise a header which is vertically adjustable to accommodate varying heights of crop material and to permit the header to be raised to transport position. The header consists of a mower for severing the crop material, a reel for raking the material rearwardly from the mower, and conditioner rolls which receive the crop material from the reel and discharge it rearwardly in a swath or into windrow forming means. In one type of machine, the mower, reel and conditioner rolls are carried on a header subframe which is pivotally mounted to a wheel-supported frame. The subframe is resiliently supported so that it can follow the contour of the ground.

In the described type of header, it is common to provide a means for adjusting the mower cutterbar so that crop material can be cut at different heights. When the cutterbar is adjusted vertically, however, the angle of the guards relative to the ground changes because of the pivotal movement of the header. In prior-art machines, the machine was designed with the optimum guard angle at the most common cutting height. When the cutterbar was adjusted for this height, the guards were necessarily moved to a less desirable angle.

SUMMARY OF THE INVENTION

Applicant's invention is directed to a control system for a header which is pivotally mounted on a vertically adjustable frame. Separate adjustment units are provided for adjusting the height of the header adjacent the cutterbar and for adjusting the angle of the header relative to the ground. The adjusting units can be used independently of each other, or they can be used together when it is desired to maintain the angle of the header substantially constant through a series of height adjustments.

The first adjustment unit comprises a pair of skid shoes which are mounted at the forward end of the header and partially support the header in operative position; the remainder of the header weight is taken by springs fixed to the rear upper portion of the header and extending to the machine frame. The skid shoes can be vertically adjusted to regulate the operating height of the cutterbar.

The second adjustment unit is a header tilt control which is provided to regulate the inclination of the header, and thus the angle of the cutterbar which is part of the header. The tilt control comprises a telescoping stop which is operatively connected to a rockshaft in the machine frame and can be adjustably poitioned in a series of holes in a vertically extending bracket on the machine draft frame. The effect of moving the telescoping stop to a different hole is to raise or lower the rockshaft, about which the header is pivotally mounted, and thereby change the inclination of the header.

The telescoping stop, in effect, determines the vertical position of the machine frame when the header is in an operative position. A hydraulic actuator is also carried on the draft frame and is connected to the rockshaft. The actuator pivotally moves the header through a lost-motion connection. Within the limits of the lost-motion connection, the actuator raises and lowers the machine frame, but it does not pivot the header upward. Since the inclination of the header is changed each time the machine frame is raised or lowered, the actuator can be used in the field to effect a slight change in the header inclination when crop conditions require a steeper guard angle.

A principal object of this invention is to provide, in an agricultural machine of the type described, a control system for pivotally mounted crop treating element wherein the vertical height of the element and the angle of the element relative to the ground can be regulated independently.

Another object of this invention is to provide a pivotally mounted header in which the operating height of the cutterbar can be adjusted while maintaining the angle of cutterbar guards substantially constant.

Another object of this invention is to provide a means for changing the inclination of a header without changing the operating height of the header.

A further object of this invention is to provide a mower-conditioner in which a rotatable reel can be vertically adjusted without changing the position of the reel relative to the mower and conditioner rolls.

A still further object of this invention is to provide means for controlling the tilt, or inclination, of a header during field operation of the machine.

Other objects of this invention will be apparent hereinafter from the specification and from the recital in the appended claims.

In the drawings:

FIG. 3 is an enlarged view of the header adjusting mechanism and showing one position of adjustment; and FIGS. 4 and 5 show two other positions of adjustment.

DESCRIPTION OF THE PREFERRED EMBODIMENT

Figure 1:
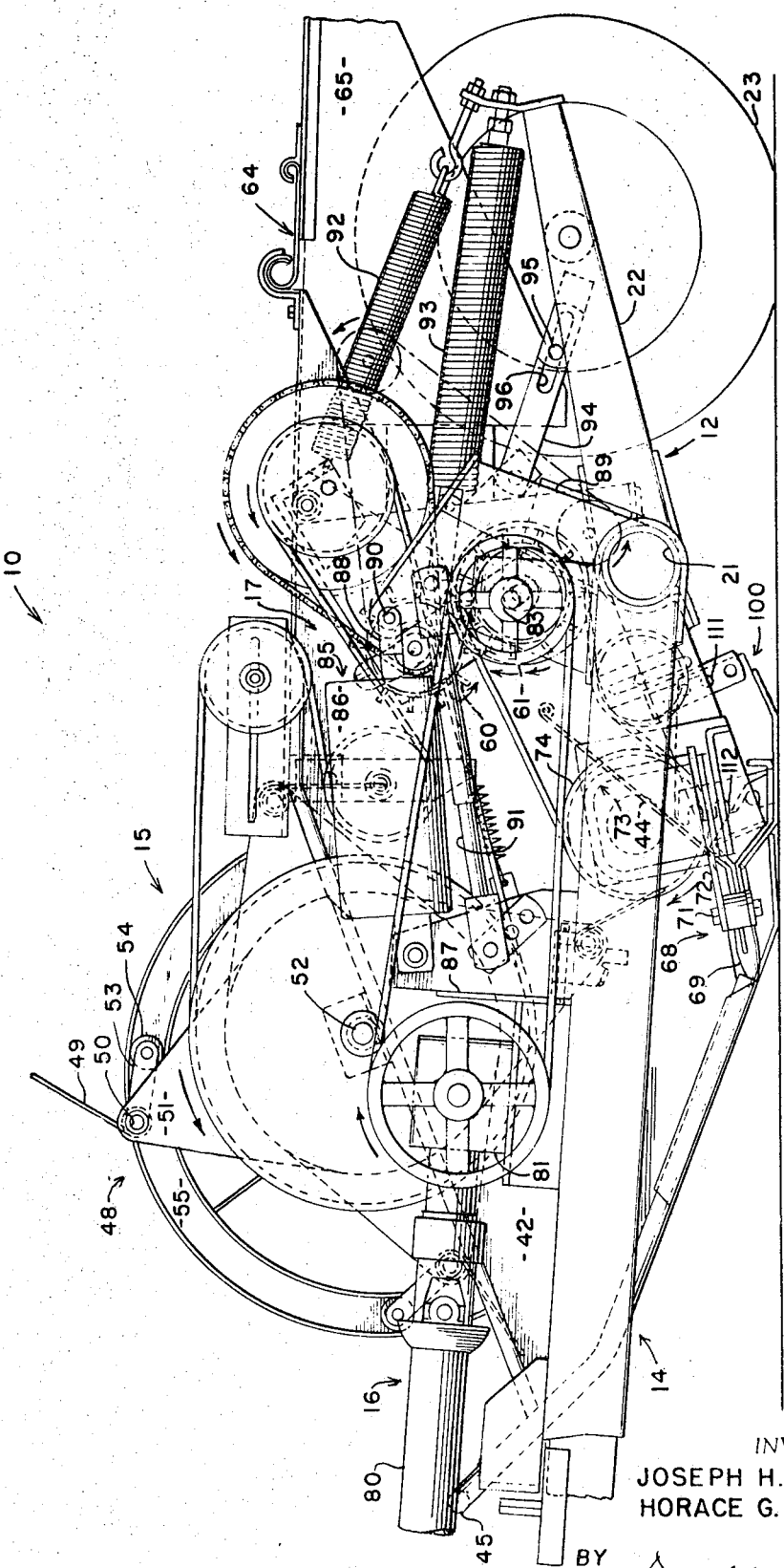
FIG. 1 is a side view of the mower-conditioner constructed in accordance with the principles of the present invention and showing the drive system, the header, and the header control system.

Referring now to the drawings by numerals of reference, and particularly to FIG. 1, the machine of this invention is designated generally 10 and comprises a transversely extending frame structure 12, a draft frame 14 along what will be referred to as the inboard side of the machine, a header 15 which extends from adjacent the draft frame to the opposite machine side called the outboard side, a drive system 16 which furnishes power to crop treating elements carried on header 15, and a lift means 17 for vertically adjusting header 15.

Figure 2:
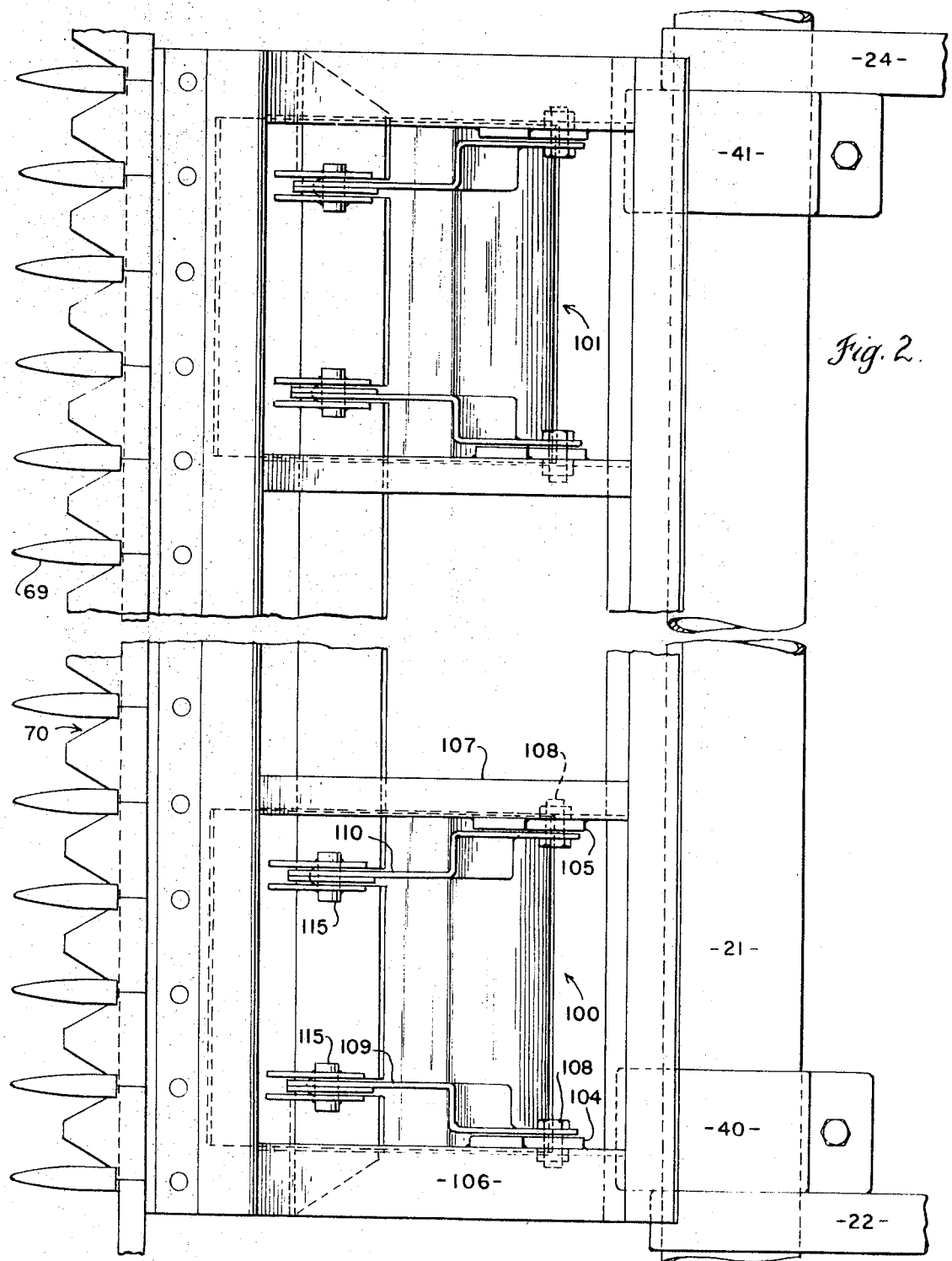
FIG. 2 is a broken out plan view of the header.

Frame structure 12 consists of a rockshaft 21, an inboard wheel arm 22 fixed to rockshaft 21, as by welding, an inboard wheel 23 journalled in wheel arm 22, an outboard wheel arm 24, partially shown in FIG. 2, and an outboard wheel, not shown.

Header 15 is pivotally supported on rockshaft 21 by a pair of mounting sleeves 40 and 41, best shown in FIG. 2. Header 15 comprises a subframe for supporting crop treating elements and consisting of a pair of side panels 42, a guide plate 44 extending between and joining the plates at their lower edges, and a crop engaging bar 45 which extends across the forward end.

A reel 48 is rotatably mounted in the header side panels 42 and has crop engaging fingers 49 which are carried on bars 50 at the outer periphery of the reel. Bars 50 are journalled in reel spiders 51 which are carried on reel shaft 52. As shown in FIG. 1, each of the bars 50 has a crank arm 53 carried on its outboard end. Each of the arms 53 carries a roller type cam follower 54 at its one end. Followers 54 ride in a channel-shaped cam track 55 which causes the tines to travel in the desired path in a well known and conventional manner.

A pair of conditioner rolls 60 and 61 are journalled in the header subframe rearwardly of reel 48. A horizontally extending crop deflector plate 64 and windrow shields 65 are mounted at the rear end of header 15 to receive crop material from conditioning rolls 60 and 61 and direct the material to the ground in a desired form.

A mower cutterbar 68 is mounted at the forward end of the header and extends between side panels 42. A plurality of conventional sickle guards 69 are fixedly mounted on cutterbar 68 and a sickle bar 70 reciprocates on the guards. As shown in FIG. 1, the inboard end of sickle bar 70 is pivotally connected at 71 to the forward end of a fore-and-aft extending rocker arm 72. Rocker arm 72 is oscillated by a wobble drive 73 which receives power through input pulley 74.

Drive system 16 comprises a P.T.O. shaft 80 which receives power from the towing vehicle, not shown, and delivers it to a gearbox 81 on draft frame 14. Power is transmitted rearwardly from gearbox 81 by a belt 83 to a stub shaft 82, journalled at the rear end of draft frame 14. Power is transmitted from stub shaft 83 to the conditioner rolls, reel, and mower through chain and belt drives, the drive system not being described in further detail since it does not form a part of this invention.

Lift means 17 for moving header 15 from an operative position to a transport position is provided by a hydraulic actuator 85 which receives pressurized fluid from the tractor, not shown. Hydraulic actuator 85 comprises a cylinder 86 which is fixed to a vertically extending bracket 87 on draft frame 18, and a reciprocating piston 88. Piston 88 serves to rotate rockshaft 21 through an arm 89 pinned to piston 88 at 90 and welded, or fixed by other means, to rockshaft 21. A telescoping stop 91, the function of which will be described hereinafter, is connected to bracket 87 and to arm 89.

Header 15 is connected to wheel arms 22 and 23 by springs 92 and 93 and links 94. A pin 95 fixed to each wheel arm extends through a slot 96 in each link 94 to provide a lost-motion connection. Within the limits of slots 96, the actuator 85 pivots rockshaft 21 to vertically move the machine frame, but does not pivot the header upward. As soon as the pins 95 reach the ends of slots 96, the header will be pivoted upwardly by the hydraulic actuator 85.

A control system is provided for header 15 by the combined action of skid shoes 100 and 101, which regulate the height of the cutterbar 68 relative to the ground, and telescoping stop 91 which functions to adjust the angle of the cutterbar relative to the ground. Each of the skid shoes 100 and 101 is similarly mounted; thus, the mounting mechanism for inboard skid shoe 190 only will be described, it being understood that the outboard skid shoe 101 is mounted in the same manner. At its rear end, skid shoe 100 is adjustably mounted to generally vertically extending elements 104 and 105 fixed respectively to header frame members 106 and 107. Fasteners 108 extend through sides 109 and 110 of shoe 100 and can be adjustably positioned in one of the holes 111. At the forward end of shoe 100, notches 112 have been cut in sides 109 and 110. Notches 112 are adapted to receive pins 115 fixed to the cutterbar 68. It will be apparent that when fasteners 108 are removed, shoe 100 can be moved rearwardly sufficiently so that pins 115 can be positioned in the desired notch. Then, fasteners 108 are mounted in holes 111 corresponding to the notche which holds the pin 115.

The header inclination, or tilt, is regulated by moving telescoping stop 91 to one of the three holes 120 on bracket 87 (see FIGS. 3-5). As the cutterbar is adjusted upwardly stop 91 is moved downwardly to the next hole 120. The effect of moving stop 91 to a lower hole in bracket 87 is to pivot wheel arms 22 in under the header 15 which increases the inclination of the header and thereby changes the angles of guards 69 on cutterbar 68.

It will be apparent from the foregoing discussion that, the angle of the guards 69 relative to ground can be maintained at the optimum angle throughout the adjustment range of skid shoes 100 and 101. It is also possible to vary the guard angle without adjusting the cutterbar height, when desired for certain operating conditions. For example, when stop 91 is set in a mounting hole 120 which does not correspond to the same position in the skid shoe, the inclination of header 15, and guards 69, is increased which allows the sickle to cut closer to the ground and the reel teeth to more efficiently pick up downed crop material. The same result can be accomplished as the machine moves through a field by hydraulically raising the machine with a slight extension of piston 88 in actuator 85. Within the limits of the lost-motion connection in links 94, the pivotal axis of header 15 can be raised without pivoting the header upward.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention.

We claim:

1. An agricultural machine adapted to travel through a field in a forward direction, said machine comprising:
   a wheel supported frame structure including a laterally extending rockshaft and a pair of radially rearwardly extending axially spaced wheel arms fixed to said rockshaft and a ground engaging wheel on each of said wheel arms adjacent the rearward end thereof;
   a subframe pivotally supported on said rockshaft, said subframe supporting crop treating elements including a cutterbar, a reel and a pair of conditioning rolls;
   a draft frame pivotally mounted at one end of said rockshaft;
   ground coacting means on said subframe for supporting the forward end thereof, said means being adjustably positionable to change the vertical height of said cutterbar relative to the ground; and
   stop means extending between said draft frame and said rockshaft for setting the angle of the cutterbar relative to the ground without changing the vertical height of the subframe.

2. An agricultural machine, as recited in claim 1, wherein said ground coacting means for adjusting the height of said cutterbar comprises a plurality of laterally spaced skid shoes fixed to said subframe for vertical adjustment of said cutterbar relative to the ground.

3. An agricultural machine, as recited in claim 1, wherein said subframe is mounted on said rockshaft for movement about a horizontal axis, said subframe supported at a forward end on the ground at a level below said horizontal axis, and lift means are provided for rotating said rockshaft and said subframe about said axis.

4. An agricultural machine, as recited in claim 1, wherein said ground coacting means comprises a pair of laterally spaced skid shoes, and each of said shoes has a rear end fastened to said subframe and a forward end fixed to said subframe adjacent said cutterbar.

5. An agricultural machine, as recited in claim 1, wherein said stop means is comprised of a telescopic link adjustably positionable between said draft frame and said rockshaft.

6. An agricultural machine which is adapted to travel through a field in a forward direction, said machine comprising:
   a wheel supported frame structure including a laterally extending rockshaft and a pair of radially rearwardly extending axially spaced wheel arms fixed to said rockshaft and a ground engaging wheel on each of said wheel arms;
   a draft frame pivotally mounted at one end of said rockshaft;
   a subframe pivotally mounted on said rockshaft adjacent said draft frame and extending to an opposite end of said rockshaft, said subframe supporting crop treating elements;
   ground contacting means on said subframe and supporting a forward end thereof, said means being adjustably positionable to change the vertical height of said cutterbar relative to the ground;
   stop means extending between said draft frame and said rockshaft for setting the angle of the cutterbar relative to the ground without changing the vertical height of the cutterbar;

7. An agricultural machine, as recited in claim 1, wherein said stop means comprises a telescoping stop, said stop is connected between a mounting bracket on said draft frame and an arm on said rockshaft and said telescoping stop can be adjustably positioned on said bracket to vary the position of said rockshaft when said subframe is in an operative position.

8. An agricultural machine adapted to travel through a field in a forward direction, said machine comprising:
   a wheel supported frame structure including a laterally extending rockshaft and a pair of radially rearwardly extending axially spaced wheel arms fixed to said rockshaft and a ground engaging wheel on each of said wheel arms adjacent the rearward end thereof;
   a subframe pivotally supported on said rockshaft, said subframe supporting crop treating elements including a cutterbar at the forward end thereof, a reel rotatably mounted above said cutterbar and a pair of conditioning rolls disposed rearwardly of said cutterbar and said reel;
   a draft frame pivotally mounted at one end of said rockshaft;
   ground coacting means on said subframe for supporting the forward end thereof, said means being adjustably mounted on said subframe to change the vertical height of said cutterbar relative to the ground; and
   telescopic stop means connected by one end to said draft frame and by the other to said rockshaft for setting the angle of the cutterbar relative to the ground without changing the vertical height of the subframe.

9. An agricultural machine, as recited in claim 8, wherein said ground coacting means comprises a pair of laterally spaced skid shoes fixed to the forward lower end of said subframe adjacent said cutterbar for vertical adjustment of said cutterbar relative to the ground.

References Cited

UNITED STATES PATENTS

| | | | |
|---|---|---|---|
| 662,442 | 11/1900 | Jennings et al. | 56—303 |
| 1,724,300 | 8/1929 | Moncreiffe | 56—23X |
| 2,627,797 | 2/1953 | Acton | 172—501X |
| 2,817,943 | 12/1957 | Collins | 56—23X |
| 3,224,177 | 12/1965 | Adee | 56—23 |
| 3,266,230 | 8/1966 | Rowbotham | 172—501X |

ROBERT E. PULFREY, Primary Examiner

S. C. PELLEGRINO, Assistant Examiner

U.S. Cl. X.R.

56—1, 303